United States Patent
Bachar et al.

(10) Patent No.: US 9,740,722 B2
(45) Date of Patent: Aug. 22, 2017

(54) REPRESENTING DYNAMIC TREES IN A DATABASE

(71) Applicant: INTERNATIONAL BUSINESS MACHINES CORPORATION, Armonk, NY (US)

(72) Inventors: Yariv Bachar, Kibbutz Ma'abarot (IL); Alon Horowitz, Tel-Aviv (IL); Aviv Kuvent, Raanana (IL); Asaf Levy, Rishon Le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 238 days.

(21) Appl. No.: 14/148,030

(22) Filed: Jan. 6, 2014

(65) Prior Publication Data

US 2015/0193489 A1    Jul. 9, 2015

(51) Int. Cl.
*G06F 7/00* (2006.01)
*G06F 17/30* (2006.01)

(52) U.S. Cl.
CPC .. *G06F 17/30327* (2013.01); *G06F 17/30339* (2013.01)

(58) Field of Classification Search
CPC ......... G06F 17/30339; G06F 17/30327; G06F 17/30286
USPC .......................... 707/756, 797, 703, 827, 741
See application file for complete search history.

(56) References Cited

U.S. PATENT DOCUMENTS

| | | |
|---|---|---|
| 2004/0006650 A1* | 1/2004 | Theimer ................. G06F 9/542 719/313 |
| 2006/0004792 A1 | 1/2006 | Lyle et al. |
| 2006/0075000 A1 | 4/2006 | Kleewein et al. |
| 2009/0125530 A1 | 5/2009 | Martinsson et al. |
| 2010/0306201 A1* | 12/2010 | Hirano .............. G06F 17/30321 707/741 |
| 2012/0117067 A1 | 5/2012 | Yakubovich et al. |
| 2013/0031229 A1* | 1/2013 | Shiga .................. G06F 17/3033 709/223 |

* cited by examiner

*Primary Examiner* — Md. I Uddin
(74) *Attorney, Agent, or Firm* — Griffiths & Seaton PLLC (57) ABSTRACT

A multiplicity of nodes are represented with a unique node identification (ID) and range ID for both enabling the database tree to be modified and identifying descendants of each of the plurality of nodes in a single query.

14 Claims, 6 Drawing Sheets

TABLE 1: NODES TABLE

| NODE ID | RANGE ID | ADDITIONAL NODE INFORMATION... |
|---------|----------|-------------------------------|
| A | 0 | |
| B | 1 | |
| C | 1 | |
| D | 2 | |
| E | 6 | |
| F | 20 | |

TABLE 2: RANGES TABLE

| NODE ID | RANGE START | RANGE END |
|---------|-------------|-----------|
| A | 1 | 1000 |
| B | 2 | 5 |
| C | 6 | 10 |
| C | 20 | 40 |

REPRESENTING DYNAMIC TREES IN A DATABASE

BACKGROUND OF THE INVENTION

Field of the Invention

The present invention relates generally to computers, and more particularly, to representing dynamic trees in a database.

Description of the Related Art

In today's society, computer systems are commonplace. Computer systems may be found in the workplace, at home, or at school. Computer systems may include data storage systems, or disk storage systems, to process and store data. Within various computing environments, computer systems may have a data model in which the data is organized into a tree-like structure. Due to various factors, challenges arise in traversing over the tree structure efficiently.

SUMMARY OF THE INVENTION

In one embodiment, a method is provided for efficient database tree representation using a processor device in a computing environment. In one embodiment, by way of example only, the method represents each of a multiplicity of nodes with a unique node identification (ID) and range ID for both enabling the database tree to be modified and identifying descendants of each of the plurality of nodes in a single query.

In another embodiment, a computer system is provided for efficient database tree representation using a processor device, in a computing environment. The computer system includes a computer-readable medium and a processor in operable communication with the computer-readable medium. In one embodiment, by way of example only, the processor represents each of a multiplicity of nodes with a unique node identification (ID) and range ID for both enabling the database tree to be modified and identifying descendants of each of the plurality of nodes in a single query.

In a further embodiment, a computer program product is provided for efficient database tree representation using a processor device, in a computing environment. The computer-readable storage medium has computer-readable program code portions stored thereon. The computer-readable program code portions include a first executable portion that represents each of a multiplicity of nodes with a unique node identification (ID) and range ID for both enabling the database tree to be modified and identifying descendants of each of the plurality of nodes in a single query.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Within a computing environment, databases are flat (tablature) structures, and by nature, are not hierarchical. Hence, a tree structure, implemented over a database, is a way to combine the advantages provided by a tree data structure, namely the hierarchical order, and the advantages of a database, namely scalability, transactional efficiency and data persistency.

In one embodiment, a tree structure is a data structure. The tree data structure may be represented by a collection of nodes (starting at a root node), where each node is a data structure consisting of a value, together with a list of references to nodes (the "children"), with the constraints that no reference is duplicated.

In one embodiment, there may be numerous ways for representing trees in a database, e.g., adjacency list, path enumeration, nested sets and nested intervals. However, a need exists for dynamically changing trees that contain millions of nodes. For example, an adjacency list does not allow scanning a sub tree in a single query and requires O(N) queries in order to provide a sub tree scan. Path enumeration is inefficient in terms of storage and impractical for very deep trees since for each node it stores an encoding of all of its ancestors. Nested sets provide a good solution for static trees, however adding new nodes to the tree or changing the position of nodes in the tree requires updating the entire tree. Nested intervals resolve the issue of adding new nodes to the tree, but still require updating an entire sub tree in case a node position is changed. Also, the information nested intervals stores in order to represent the node position in the tree can not be indexed in a database, which makes search operations very inefficient.

Thus, the present invention provides a solution for representing dynamic trees in a database using a processor device in a computing environment. In one embodiment, by way of example only, the present invention represents each of a multiplicity of nodes with a unique node identification (ID) and range ID for both enabling the database tree to be modified and identifying descendants of each of the plurality of nodes in a single query.

In one embodiment, the following essential requirements for a database tree representation are define. (1) The present invention enables scanning a sub tree using a single query. (2) The present invention efficiently supports changes in the tree structure. (3) The present invention enables an efficient search for nodes and sub trees in the database.

In one embodiment, the present invention defines a table of ranges that specifies each of the multiplicity of nodes that has a descendent. The table of ranges is separate from a table of the multiplicity of nodes. The present invention also holds a multiplicity of ranges for one of the multiplicity of nodes without duplicating information of the one of the multiplicity of nodes using the table of ranges. The table of ranges allows for scalable growth in the amount of the multiplicity of nodes contained in a sub-tree of the database tree under the one of the multiplicity of nodes without modifying existing ranges. The present invention also combines the range ID and the table of ranges for defining the database tree structure.

In one embodiment, the present invention adds a new one of the multiplicity of nodes to the database tree, defines the range ID of the new one of the multiplicity of nodes to be equal to a start range of a direct parent of the new one of the multiplicity of nodes, requests a partial range from the direct parent to the new one of the multiplicity of nodes, allocates a new range for the one of the multiplicity of nodes of the direct parent, and if the new one of the multiplicity of nodes that is added to the database tree is a first node in the database tree: the present invention sets the range ID to zero (0), sets the start range to one (1), and sets an end range to a numerical value equal to $2^{64}$. In one embodiment, if the one of the multiplicity of nodes that is added to the database tree is a first node in the database tree: the range ID is set to one of a multiplicity of values (e.g., predetermined and/or dynamically determined), the start range is set to one of a multiplicity of values, and an end range is set to a numerical value equal to one of the multiplicity of values.

In one embodiment, the present invention deletes one of the multiplicity of nodes from the database tree by deleting rows related to the one of the multiplicity of nodes from both the multiplicity of nodes and the table of ranges. For deleting the one of the multiplicity of nodes from the database tree, the present invention fails an operation if the one of the multiplicity of nodes has a child node, removes a row related to the one of the multiplicity of nodes from the table of the multiplicity of nodes, and/or removes each of the rows related to the one of the multiplicity of nodes from the table of ranges.

Also, the present invention allows for changing the position of one of the nodes in the database tree. For changing the position of one of the multiplicity of nodes in the database tree, the present invention sets the range ID of one of the multiplicity of nodes to be equal to a start range of a direct parent of the one of the multiplicity of nodes, determines if a new parent node of the one of the multiplicity of nodes that is changing the position contains changed node ranges, removes the changed node ranges from the previous parent node of the one of the multiplicity of nodes, identifies a parent node as a common ancestor to the one of the multiplicity of nodes (e.g., the migration of ranges from an older parent to new parent is a process which may proceed recursively until a common ancestor is reached, and/or adds new ranges to the new parent of the one of the multiplicity of nodes). In one embodiment, the present invention migrates the range ID and ranges from the previous parent node to the new parent node for the one of the multiplicity of nodes that is changing the position.

In one embodiment, the present invention provides for dynamically changing trees efficiently (e.g., moving a subtree from one branch to another in the database tree structure), instead only referring to insertion and/or deletion of nodes. In one embodiment, by way of example only, the tree is given and changes dynamically by the user and/or application, and the present invention provides for maintaining this tree-structure in a flat environment (e.g. database). In other words, a sub tree is moved from one part of the tree to another part of the tree and also updates, modifies, and/or changes an entire sub tree in a single query.

Figure 1:
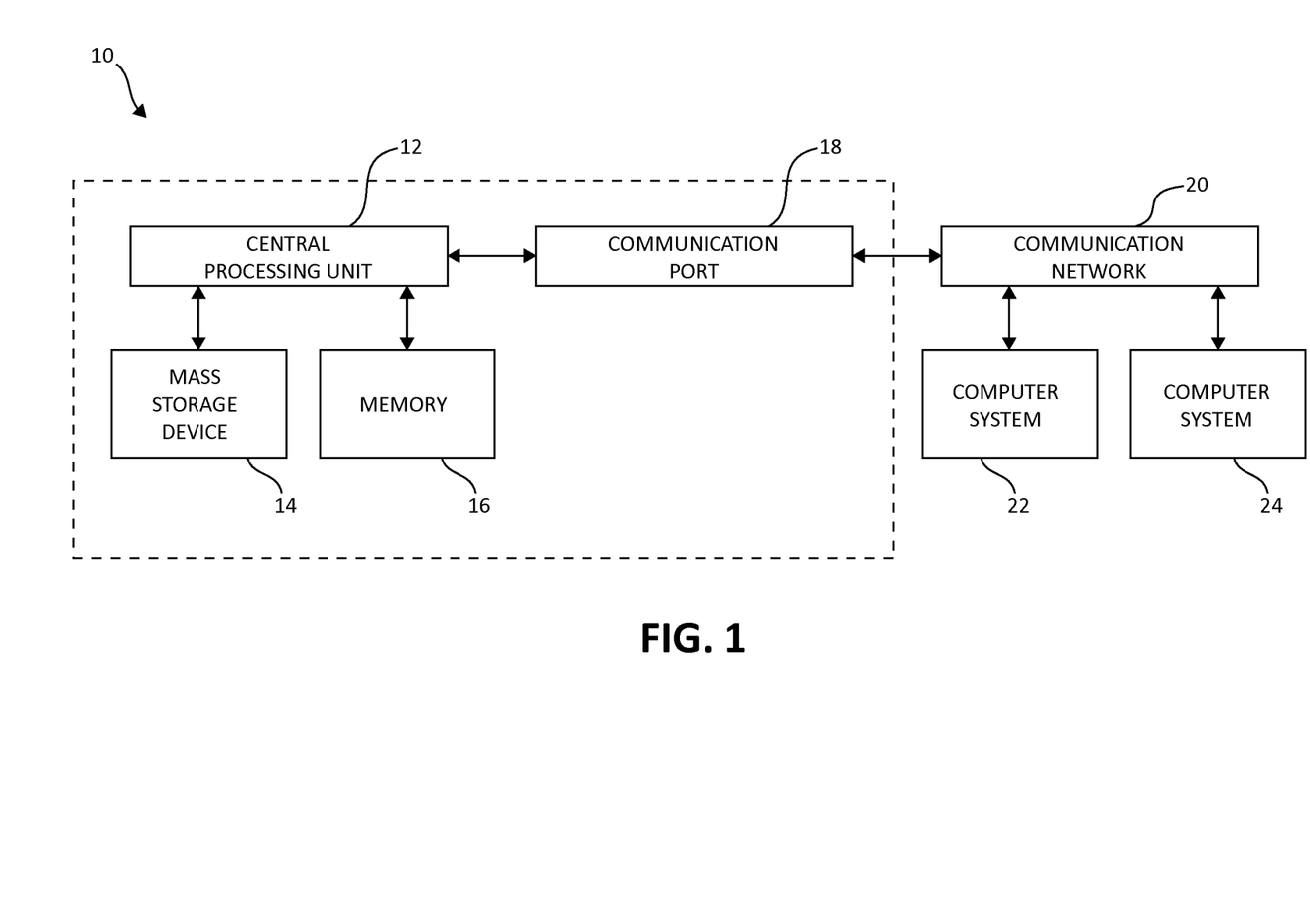
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
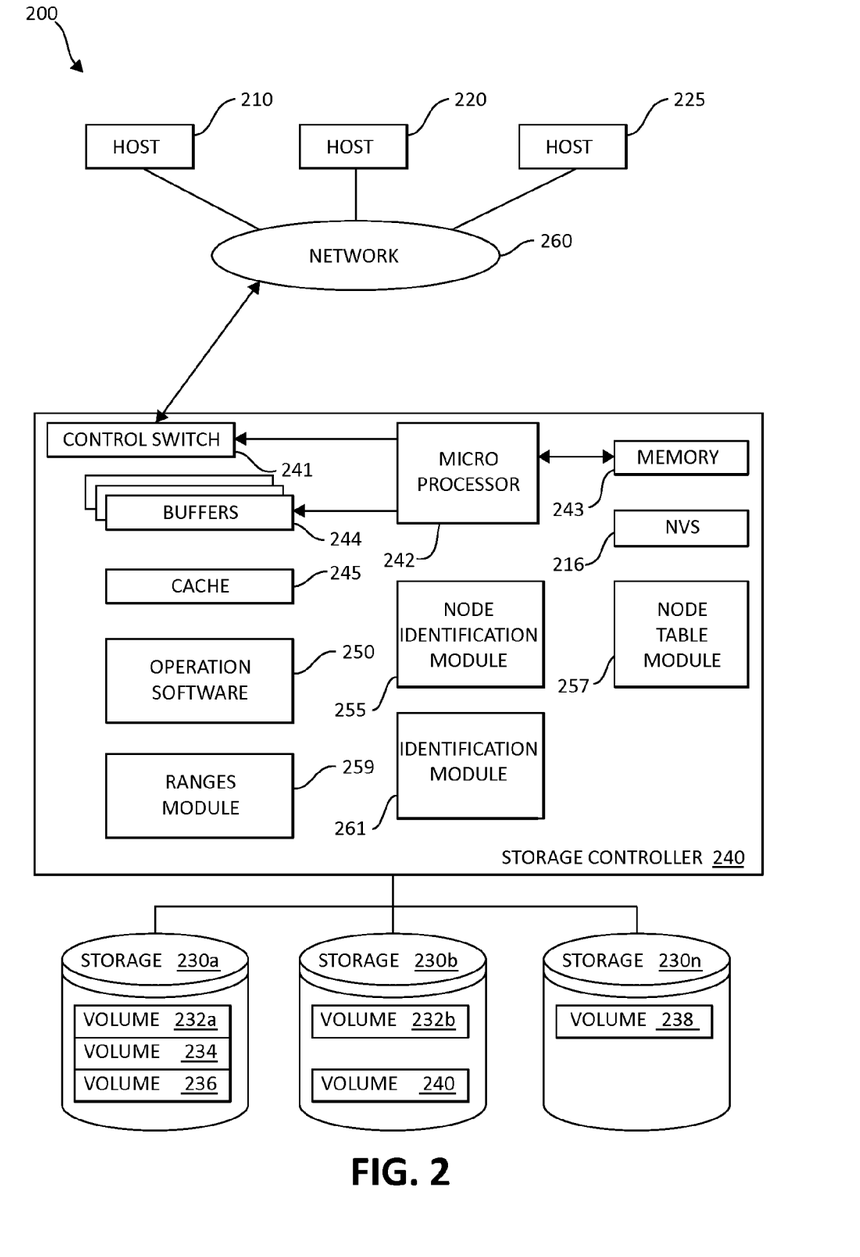
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a node identification module 255, a node table module 257, a table of ranges module 259, and an identification module (unique ID and range ID) 261) may work in conjunction with each and every component of the storage controller 240, the hosts 210, 220, 225, and storage devices 230. The node identification module 255, the node table module 257, the table of ranges module 259, and the unique ID and range ID module 261 may be structurally one complete module or may be associated and/or included with other individual modules. The node identification module 255, the node table module 257, the table of ranges module 259, and the unique ID and range ID module 261 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, node identification module 255, the node table module 257, the table of ranges module 259, and the unique ID and range ID module 261 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the node identification module 255, the node table module 257, the table of ranges module 259, and the unique ID and range ID module 261 may also be located in the cache 245 or other components. The RAM (random access memory) is the place in a computer where the operating system, application programs, and data in current use are kept so that they can be quickly reached by the computer's processor 242. The RAM is much faster to read from and write to than the other kinds of storage in a computer, the hard disk, floppy disk, and CD-ROM. As such, one or more RAM may be used as needed, based upon the storage architecture and users preferences.

In one embodiment, the present invention provides a new algorithm for database tree representation, which allows for identifying a node's descendants using a single indexable query, thereby eliminating the need to iterate over the node's sub tree. In one embodiment, the database tree is represented as a database table; each node in the tree is represented by a row and has a unique ID and a range ID, which defines its position in the tree. Also, the present invention defines a ranges table that specifies for each node that has children, the range IDs that its descendants may hold.

Figure 3:
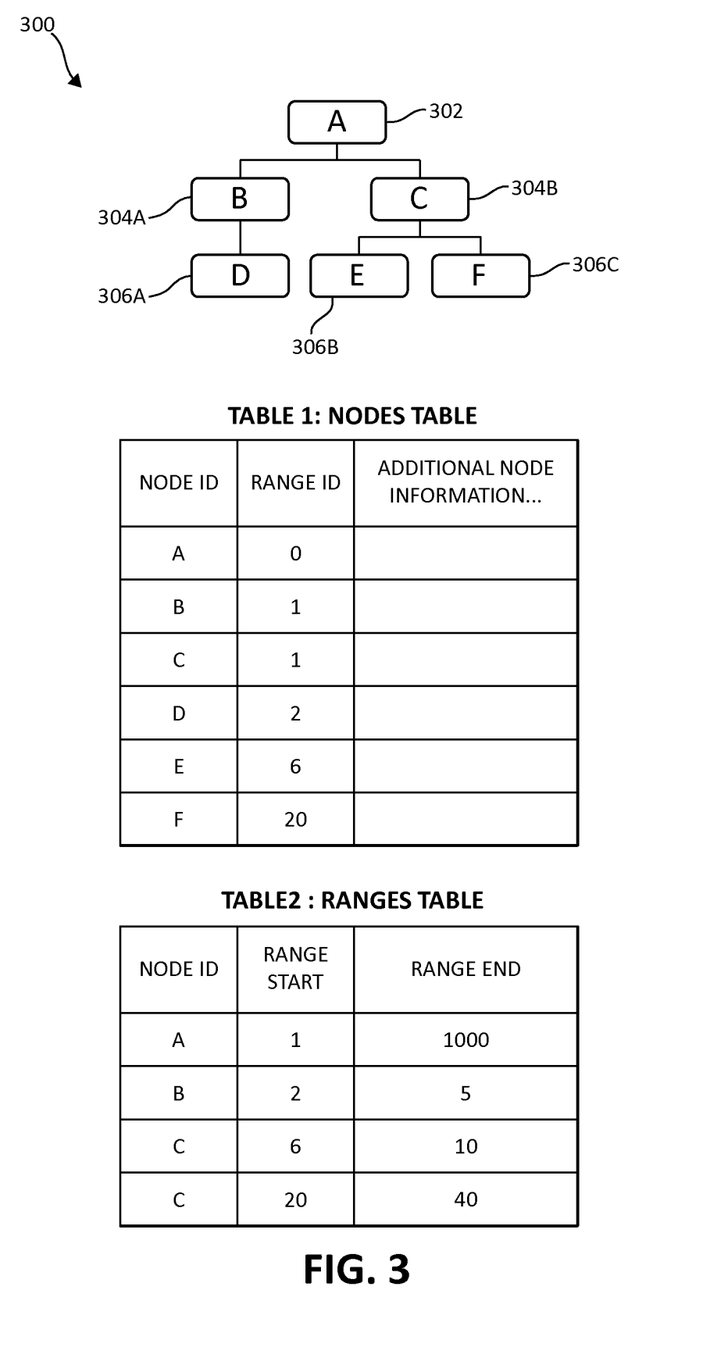
FIG. 3 is a block diagram illustrating a database tree structure in which aspects of the present invention may be realized.

For example, the tree depicted in FIG. 3 may be represented by Table 1 and Table 2. FIG. 3 is a block diagram illustrating a database tree structure in which aspects of the present invention may be realized. The nodes (302, 304, and 306) are depicted with a grandparent node 302, at least 2 parent nodes 304A and 304B and three grandchildren nodes 306A-C. Table 1 indicates the node ID, the Range ID, and any additional node information that may be required. Table 2 indicates the range table with a node ID, a range start, and a range end. The combination of the range ID assigned to each node 302, 304, and 306, and the ranges table allows us to define the tree structure. Node B 304A is a child of node A 302 since its range ID equals node A 302 range start. Node D 306A is a descendant of node A 302 since node D 306A range ID (2) is contained in node's A 302 range (1-1000). Also a query that needs to scan an entire sub tree may simply query for all of the nodes that their range IDs are contained in one of the ranges of the sub tree root node. Note that, in one embodiment, since the present invention uses continuous ranges in order to perform the query, a database index can be used in order to perform the query efficiently.

When a node is added to the tree the present invention define its range ID to be equal to the range start of its direct parent. The new node also requires a range from its parent, which was not yet allocated to another node. In case the new node's parent does not have a range available, the parent requests a new range from its parent. This process repeats until, at worst, the present invention reach the root node, which is assumed will always have a new range to allocate since there is an infinite amount of natural numbers. A standard implementation may use a 64-bit variable, which will last for $2^{64}$ range IDs, a tree large enough for any practical use. Nodes are removed from the tree by deleting the rows related to them from both the nodes and the ranges tables.

In one embodiment, one of the key points in the present invention is that since ranges are contained in a separate table, the present invention efficiently supports holding multiple ranges for the same node (e.g., without duplicating the node information). This allows scalable growth in the amount of nodes contained in the sub tree under a node without the need to modify existing ranges. In the worst case, adding a new node will require O(D) operations where D is defined as the depth of the newly added node parent. When adding a new node, if the present invention allocates ranges with a size of at least D, the present invention may amortize the node addition operation to O(1). Note that in a well balanced tree, D will equal Log(N) where N is defined as the total number of nodes in the tree.

Changing a position of a node X in the tree, requires migration of the node range ID and ranges from its current parent to its new parent. This process begins by adding the ranges of node X to its new parent. The new parent, in turn, adds its new ranges to its own parent, a process which repeats until the present invention reach the common ancestor of the current and new parents which already contains the migrated ranges (in the worst case this will be the root node). In the second phase, the present invention removes node X's ranges from its current parent which in turn will remove them from its own parent. This process repeats until the common ancestor is reached. Adding the ranges to node X new ancestors is done before removing the ranges from its current ancestors in order to easily identify the common ancestor.

Figure 4:
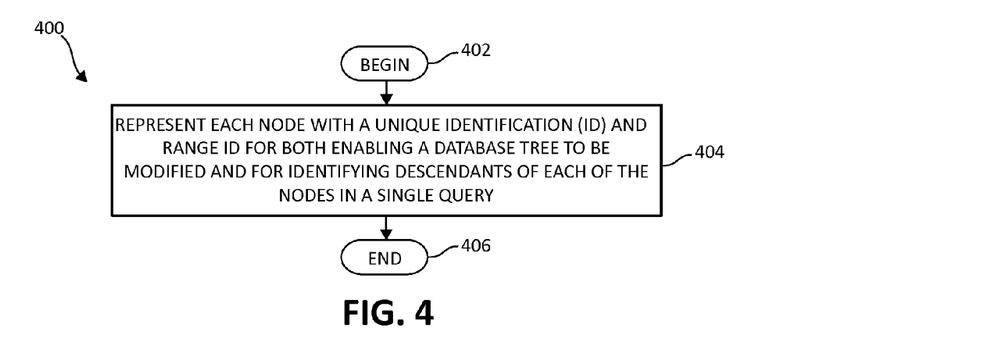
FIG. 4 is a flow chart diagram illustrating a method for representing dynamic trees in a database in which aspects of the present invention may be realized.

FIG. 4 is a flow chart diagram illustrating a method 400 for representing dynamic trees in a database in which aspects of the present invention may be realized. The method 400 begins (step 402) by representing each of a multiplicity of nodes with a unique node identification (ID) and range ID for both enabling the database tree to be modified and identifying descendants of each of the plurality of nodes in a single query (step 404). The method 400 ends (step 406).

Figure 5:
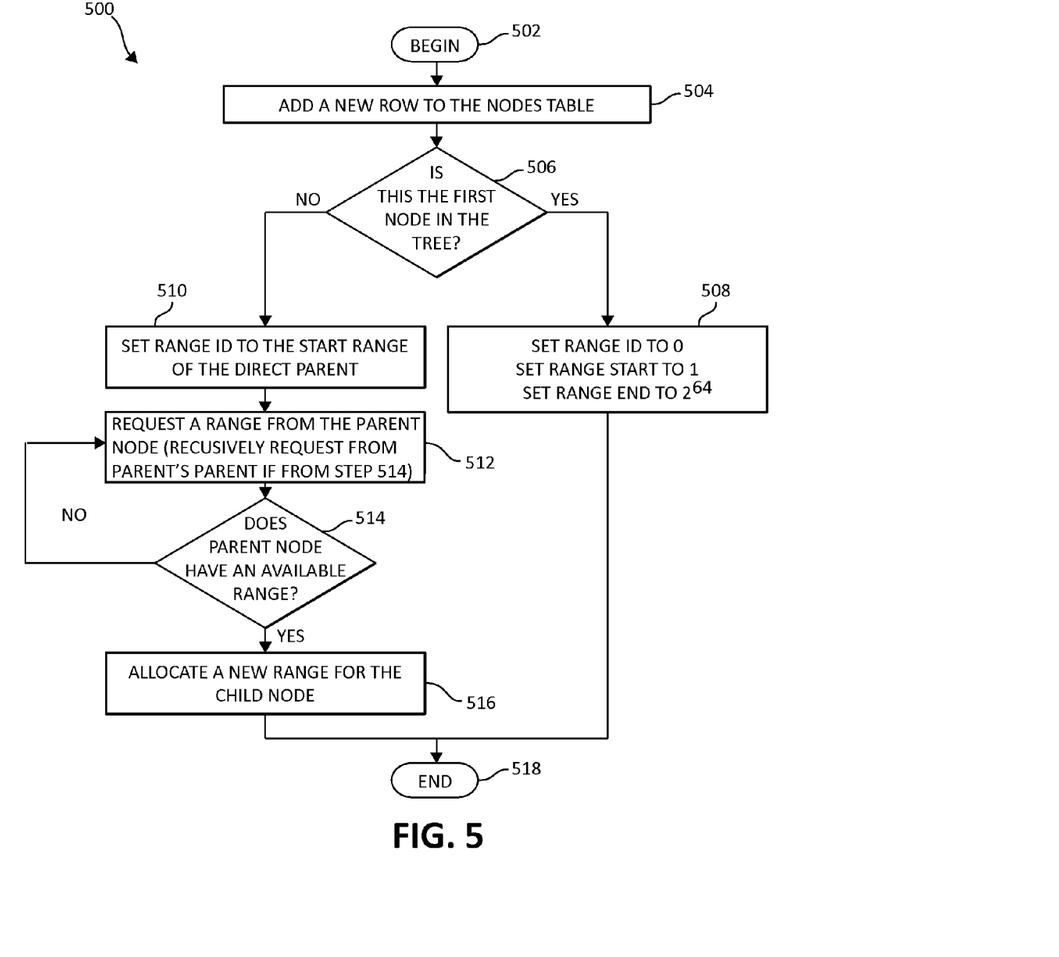
FIG. 5 is a flow chart diagram illustrating a method for adding a node in the database tree in which aspects of the present invention may be realized.

In one embodiment, as described in FIG. 5, the present invention adds a new row to the nodes table. If this node is the first node in the tree, the present invention sets the range ID to 0, sets the range Start to 1, and sets the range End to $2^{64}$. If this node is not the first node in the tree, the present invention sets the range ID to the start range of the direct parent. The present invention requests a range from the parent node. If the parent has an available range allocate a new range for the child node. If the parent does not have an available range go to step 3.b with the parent as the current node (recursive call).

FIG. 5 is a flow chart diagram illustrating a method 500 for adding a node in the database tree in which aspects of the present invention may be realized. The method 500 begins (step 502) adding a new row to the nodes table (step 504). The method 500 determines if the node is the first node in the database tree (step 506). If yes, the method 500 sets a range ID to zero (0), sets a range start to one (1), and sets a range end to a numerical value equal to $2^{64}$ (step 508) and then the method 500 may end (step 518). Returning to step 508, if no, the method 500 sets the range ID to the start rage of the direct parent (step 510). The method 500 requests a range from the parent node (step 512) and then determines if the parent node has an available range (step 514). If no, the method returns back to step 512 (may recursively request from parent's parent). If yes, the method 500 allocates a new range for the child node (step 516). The method 500 then ends (step 518).

Figure 6:
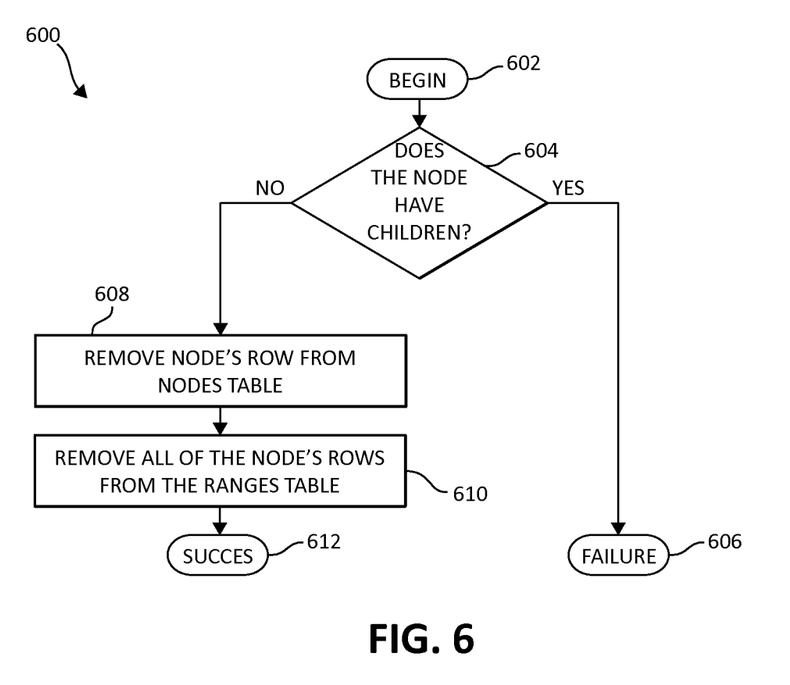
FIG. 6 is a flow chart diagram illustrating a method for deleting a node in the database tree in which aspects of the present invention may be realized.

In one embodiment, as described in FIG. 6, may remove the node from the database tree. In one embodiment, if the node has any children, the present invention will fail the node removal operation. If the node does not have children, the present invention removes the node's row from the nodes table, and/or removes all of the node's rows from the ranges table. Turning now to FIG. 6, a flow chart diagram illustrating a method 600 for deleting a node in the database tree is depicted in which aspects of the present invention may be realized. The method 600 begins (step 602) by determining if the node has any children (child nodes) (step 604). If yes, the method fails the removal operation (step 606). If no, the method 600 removes the node's rows from the node table (step 608). The method 600 then removes all of the node's rows from the table of ranges (step 610). The method 600 ends (step 612).

Figure 7:
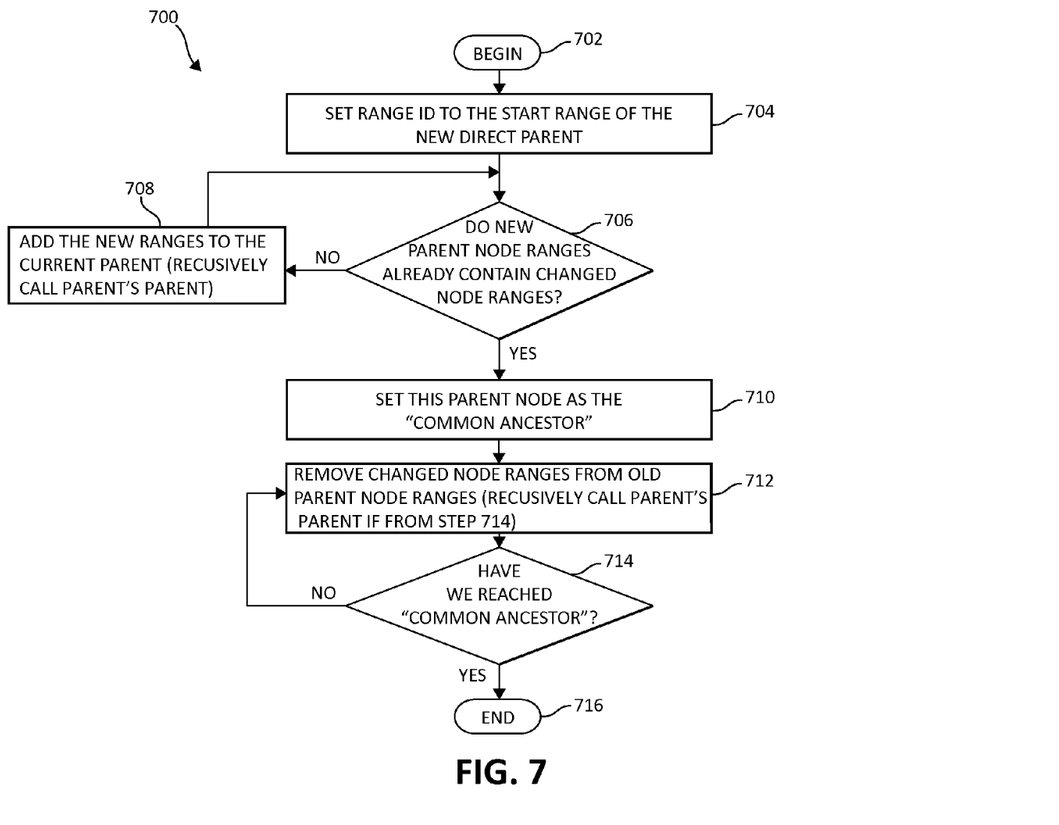
FIG. 7 is a flow chart diagram illustrating a method for moving positions for a node in the database tree in which aspects of the present invention may be realized.

In one embodiment, as described in FIG. 7, the present invention may move the position of the node in the database tree. First, the range ID is set to the start Range of the new direct parent. If the new parent node ranges do not the contain the changed node range, the present invention adds the new ranges to the current parent, and then may perform this operation as a recursive call with the parent as the current node (recursive call). If the new parent node ranges contain the changed node ranges, the present invention set this parent node as the "common ancestor." The changed node ranges is removed from the old parent node ranges. If the present invention didn't reach the "common ancestor" go back to the operation of removing the changed node ranges from the old parent node ranges with the parent as the current node (recursive call). Turning now to FIG. 7, a flow chart diagram illustrating a method 700 for moving positions for a node in the database tree is depicted in which aspects of the present invention may be realized. The method 700 begins (step 702) by setting a range ID to the start range of the new direct parent (step 704). The method 700 determines if the new parent node ranges already contain changed node ranges (step 706). If no, the method 700 adds the new ranges to the current parent node (step 714) and then returns back to step 706, now executing it on the parent's parent (recursively). If yes, the method 700 sets the new parent node as the "common ancestor" (step 708). The method 700 removes the changed node ranges from old parent node ranges (step 710) and then determines if a common ancestor is reached (step 712). If no, the method returns to step 712, now executing it on the parent's parent (recursively). If yes, the method 700 ends (step 716).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable signal medium or a non-transitory computer readable storage medium. A non-transitory computer readable storage medium may be, for example, but not limited to, 1) an electronic system, apparatus, or device, or any suitable combination therein, 2) a magnetic system, apparatus, or device, or any suitable combination thereof, 3) an optical system, apparatus, or device, or any suitable combination, 4) an electromagnetic system, apparatus, or device, or any suitable combination, 5) an infrared system, apparatus, or device, or any suitable combination, or semiconductor system, apparatus, or device, or any suitable combination of the foregoing (all of which are non-transitory). More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for efficient database tree representation using a processor device in a computing environment, the method comprising:
    representing each of a plurality of nodes with a unique node identification (ID) and range ID for both enabling the database tree to be modified and identifying descendants of each of the plurality of nodes in a single query;
    defining a table of ranges that specifies each of the plurality of nodes that has a descendent, wherein the table of ranges is separate from a table of the plurality of nodes;
    holding a plurality of ranges for one of the plurality of nodes without duplicating information of the one of the plurality of nodes using the table of ranges, wherein the table of ranges allows for scalable growth in the amount of the plurality of nodes contained in a sub-tree of the database tree under the one of the plurality of nodes without modifying existing ranges;
    combining the range ID and the table of ranges for defining a database tree structure;
    adding a new one of the plurality of nodes to the database tree;
    defining the range ID of the new one of the plurality of nodes to be equal to a start range of a direct parent of the new one of the plurality of nodes;
    requesting a range of the direct parent to the new one of the plurality of nodes;
    allocating a new range for the one of the plurality of nodes of the direct parent; and
    if the new one of the plurality of nodes that is added to the database tree is a first node in the database tree:
        setting the range ID to one of a plurality values,
        setting the start range to one of the plurality values, and
        setting an end range to a numerical value equal to one of the plurality values.

2. The method of claim 1, further including deleting one of the plurality of nodes from the database tree by deleting rows related to the one of the plurality of nodes from both the plurality of nodes and the table of ranges.

3. The method of claim 2, further including, for deleting the one of the plurality of nodes from the database tree, performing at least one of:
    failing an operation if the one of the plurality of nodes has a child node,
    removing a row related to the one of the plurality of nodes from the table of the plurality of nodes, and
    removing each of the rows related to the one of the plurality of nodes from the table of ranges.

4. The method of claim 1, further including migrating the range ID and ranges from the previous parent node to the new parent node for the one of the plurality of nodes that is changing a position.

5. The method of claim 4, further including, for changing the position of one of the plurality of nodes in the database tree, performing at least one of:
    setting the range ID of one of the plurality of nodes to be equal to a start range of a direct parent of the one of the plurality of nodes,
    determining if a new parent node of the one of the plurality of nodes that is changing the position contains changed node ranges,
    removing the changed node ranges from the previous parent node of the one of the plurality of nodes,
    setting the new parent node as a common ancestor to the one of the plurality of nodes, and
    adding new ranges to the new parent of the one of the plurality of nodes.

6. A system for efficient database tree representation in a computing environment, the system comprising:
    a plurality of nodes; and
    at least one processor device in communication with the plurality of nodes, wherein the processor device:
        represents each of the plurality of nodes with a unique node identification (ID) and range ID for both enabling the database tree to be modified and identifying descendants of each of the plurality of nodes in a single query,
        defines a table of ranges that specifies each of the plurality of nodes that has a descendent, wherein the table of ranges is separate from a table of the plurality of nodes,
        holds a plurality of ranges for one of the plurality of nodes without duplicating information of the one of the plurality of nodes using the table of ranges, wherein the table of ranges allows for scalable growth in the amount of the plurality of nodes contained in a sub-tree of the database tree under the one of the plurality of nodes without modifying existing ranges,
        combines the range ID and the table of ranges for defining a database tree structure,
        adds a new one of the plurality of nodes to the database tree,
        defines the range ID of the new one of the plurality of nodes to be equal to a start range of a direct parent of the new one of the plurality of nodes,
        requests a range of the direct parent to the new one of the plurality of nodes,
        allocates a new range for the one of the plurality of nodes of the direct parent, and if the new one of the plurality of nodes that is added to the database tree is a first node in the database tree:
   sets the range ID to one of a plurality values,
   sets the start range to one of the plurality values, and
   sets an end range to a numerical value equal to one of the plurality values.

7. The system of claim 6, wherein the at least one processor device deletes one of the plurality of nodes from the database tree by deleting rows related to the one of the plurality of nodes from both the plurality of nodes and the table of ranges.

8. The system of claim 7, wherein the at least one processor device, for deleting the one of the plurality of nodes from the database tree, performs at least one of:
   failing an operation if the one of the plurality of nodes has a child node,
   removing a row related to the one of the plurality of nodes from the table of the plurality of nodes, and
   removing each of the rows related to the one of the plurality of nodes from the table of ranges.

9. The system of claim 6, wherein the at least one processor device migrates the range ID and ranges from the previous parent node to the new parent node for the one of the plurality of nodes that is changing a position.

10. The system of claim 9, wherein the at least one processor device, further including, for changing the position of one of the plurality of nodes in the database tree, performs at least one of:
   setting the range ID of one of the plurality of nodes to be equal to a start range of a direct parent of the one of the plurality of nodes,
   determining if a new parent node of the one of the plurality of nodes that is changing the position contains changed node ranges,
   removing the changed node ranges from the previous parent node of the one of the plurality of nodes,
   setting the new parent node as a common ancestor to the one of the plurality of nodes, and
   adding new ranges to the new parent of the one of the plurality of nodes.

11. A computer program product for efficient database tree representation using a processor device, the computer program product comprising a non-transitory computer-readable storage medium having computer-readable program code portions stored therein, the computer-readable program code portions comprising:
   a first executable portion that:
      represents each of a plurality of nodes with a unique node identification (ID) and range ID for both enabling the database tree to be modified and identifying descendants of each of the plurality of nodes in a single query;
      defines a table of ranges that specifies each of the plurality of nodes that has a descendent, wherein the table of ranges is separate from a table of the plurality of nodes;
      holds a plurality of ranges for one of the plurality of nodes without duplicating information of the one of the plurality of nodes using the table of ranges, wherein the table of ranges allows for scalable growth in the amount of the plurality of nodes contained in a sub-tree of the database tree under the one of the plurality of nodes without modifying existing ranges;
      combines the range ID and the table of ranges for defining a database tree structure;
      adds a new one of the plurality of nodes to the database tree;
      defines the range ID of the new one of the plurality of nodes to be equal to a start range of a direct parent of the new one of the plurality of nodes;
      requests a range of the direct parent to the new one of the plurality of nodes;
      allocates a new range for the one of the plurality of nodes of the direct parent; and
      if the new one of the plurality of nodes that is added to the database tree is a first node in the database tree:
         sets the range ID to one of a plurality values,
         sets the start range to one of the plurality values, and
         sets an end range to a numerical value equal to one of the plurality values.

12. The computer program product of claim 11, further including a second executable portion that deletes one of the plurality of nodes from the database tree by deleting rows related to the one of the plurality of nodes from both the plurality of nodes and the table of ranges.

13. The computer program product of claim 12, further including a third executable portion that, for deleting the one of the plurality of nodes from the database tree, performs at least one of:
   failing an operation if the one of the plurality of nodes has a child node,
   removing a row related to the one of the plurality of nodes from the table of the plurality of nodes, and
   removing each of the rows related to the one of the plurality of nodes from the table of ranges.

14. The computer program product of claim 11, further including a second executable portion that migrates the range ID and ranges from the previous parent node to the new parent node for the one of the plurality of nodes that is changing a position, wherein for changing the position of one of the plurality of nodes in the database tree, performing at least one of:
   setting the range ID of one of the plurality of nodes to be equal to a start range of a direct parent of the one of the plurality of nodes,
   determining if a new parent node of the one of the plurality of nodes that is changing the position contains changed node ranges,
   removing the changed node ranges from the previous parent node of the one of the plurality of nodes,
   setting the new parent node as a common ancestor to the one of the plurality of nodes, and
   adding new ranges to the new parent of the one of the plurality of nodes.

* * * * *